INVENTORS.
CHARLES J. BENSON
EDWIN F. POTTER
CARL ROSE
ELWOOD P. SCHOLLENBERGER
BY
THEIR ATTORNEYS

2,796,284
Patented June 18, 1957

2,796,284

FLUSH RELEASE DEVICE FOR EXTERNAL STORES

Charles J. Benson, Philadelphia, Edwin F. Potter, Upper Darby, Carl Rose, Philadelphia, and Elwood P. Schollenberger, Springfield, Pa.

Application February 18, 1953, Serial No. 337,697

2 Claims. (Cl. 294—83)

(Granted under Title 35, U. S. Code (1952), sec. 266)

The invention described herein may be manufactured and used by or for the Government of the United States of America for governmental purposes without the payment of any royalties thereon or therefore.

This invention relates to new and useful improvements in a releasing device and more particularly to a device such that, after an object has been jettisoned from supporting structure such as an airplane, the attaching mechanism for the released object is extended so that the external surface of said supporting structure is free from projections or recesses.

An object of the present invention is to provide a detaching device that is flush with its supporting surfaces so that no areas of said device project beyond the contour of said supporting structure either in the loaded or unloaded positions.

Another object of the present invention is to provide a positive locking and positive releasing and detaching device for objects that contains no projecting hooks or fittings wherein the release is accomplished with little attention or effort on the part of the operator.

Still another object is to provide a device that is simple and inexpensive to manufacture and yet durable and has few moving parts.

These and other objects of the invention and the various features and details of construction and operation thereof are hereinafter more fully set forth and described with reference to the accompanying drawings, in which like numbers refer to like parts.

Operation of the mechanism will best be understood by referring to Figs. 1 through 4 inclusive. The device consists of four major elements, namely, a first cup or housing 11 tubular in shape for encasing the mechanism, a second tubular cup or core 13 serving as an entry socket for a lug attached to a load, a third tubular cup or retainer-cap 25 sliding between said housing and said core, and a latch 43, attached to the retainer-cap for holding said mechanism in unloaded or loaded position.

Figure 1:
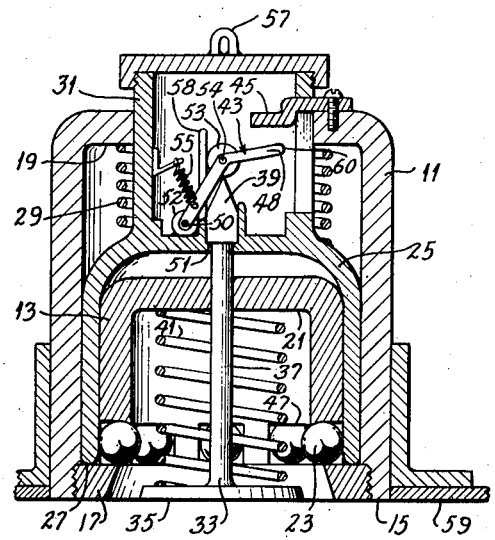
Fig. 1 is a cross-sectional view of the mechanism in the unloaded position.

In Fig. 1, the mechanism is shown in the unloaded position. Said mechanism is mounted so that the rim 15 of the housing is flush with the skin 59 of the aircraft. Two flanges on said housing serve as anchors for attaching the mechanism to the supporting structure. The core 13 is coaxial with and nested in said housing having its rim 17 screwed into rim 15 of the housing. Retainer-cap 25 slides neatly and smoothly over said core either freeing or retaining bearing balls 23 loosely staked in holes 47 in the core. The core holes are so designed that said bearing balls cannot be cammed out of the core but are capable of being radially cammed inward or outward of core holes.

As a lug 49 of an object shaped like a half-round ball around which a groove is cut is pressed inward against the outer face 35 of cover-spindle 33, a helical compression spring 41 bearing on core bottom 21 and the inner face of the cover-spindle is forced into compression. At the same time head 39 of said cover-spindle bears against a roller 53 mounted on latch 43 forcing retainer-cap 25 upward. Said latch 43 consists of rollers 52 and 53 which are pin connected to a curved lever 48 and spring 55. Said lever 48 is pivotable about pin 50, whereas roller 53 is rotatable on pin 54. The latch is attached to the tubular dome 31 of retainer-cap 25 at roller end 52 and is under tension of spring 55. Roller 53 is held in position on head 39 by the action of spring 55, said spring urging bar 48 upward and maintaining roller 53 against support guide 58 until the shaped end 60 of said latch bears against a detent 45 of said housing.

Figure 3:
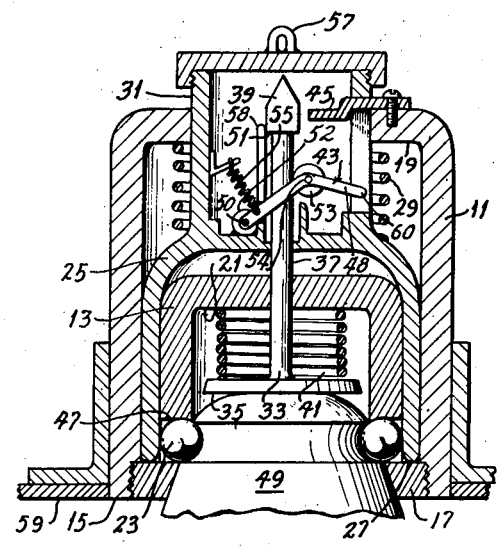
Fig. 3 is a cross-sectional view of the mechanism with a load securely attached in loaded position.
Figure 2:
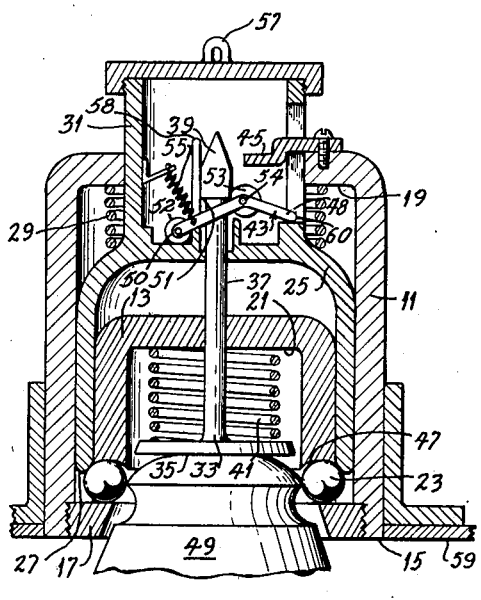
Fig. 2 is a cross-sectional view of the mechanism showing an object being attached to said mechanism.
Figure 4:
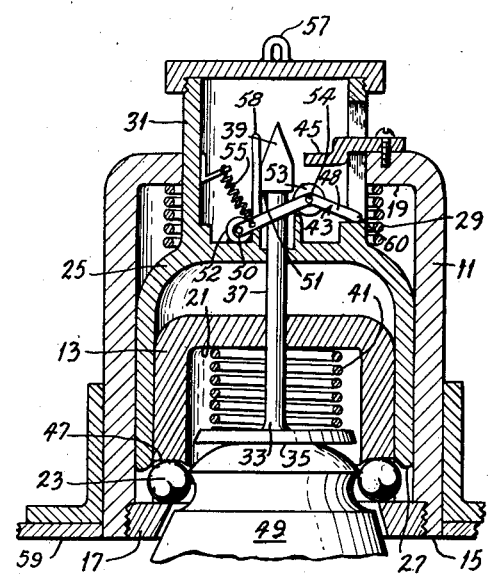
Fig. 4 is a cross-sectional view of the mechanism as the load is released from said mechanism.

As the shaft stem 37 of cover-spindle 33 is forced farther inward, retainer-cap 25 is urged upward and bears against helical compression spring 29 mounted between bottom 19 of the housing and said retainer cap. Guides mounted on the tubular dome of said retainer cap provide a path for head 39 in its travel from rest position to actuated position. Roller 53 slips off head 39 when the shaped end 60 of latch 43 makes contact with detent 45 during the upward movement of retainer-cap 25 and assumes the position shown in Fig. 2. When the grooved portion of the lug reaches the level of the core holes, spring 29 urges the retainer-cap downward. This action causes rim 27 of said retainer-cap to cam the balls radially inward into the grooved portion of the lug thereby securely retaining the lug in the loaded position as shown in Fig. 3.

The load is jettisoned by pulling on a cord or other suitable means (not shown) attached to a lug 57 of tubular dome 31. This act causes retainer-cap 25 to move upward against spring 29. Due to the combined forces of gravity and spring 41, the lug of said load cams bearing balls 23 radially outward toward a slide space between the housing and core. (See Fig. 4.) Lug 49 is thereby released from the mechanism. Spring 41 continues to urge cover-spindle 33 downward until the shoulder stop 51 of head 39 rests in the well of retainer cap. At the same time tension spring 55 attached to latch 43 and a pin on tubular dome 31 urges said latch into latched position. The mechanism is then returned to flush position as shown in Fig. 1.

From the foregoing description and illustration of the present invention it is apparent that a loading and jettisoning device of simple design is provided wherein a load can be installed and locked in place quickly and easily, and, when the mechanism is actuated, said load is released from its support. The mechanism is of such design that no area protrudes from said device at any stage of its operation and in the unloaded or released position, the device is flush with the contour of the airplane.

While a particular embodiment of the invention has been shown and described herein, it is not intended that the invention be limited to such disclosure, but that changes and modifications can be made and incorporated within the scope of the claims.

What is claimed:

1. A device for selectively holding and releasing lugs on an aircraft comprising a first tubular cup having its rim flush with the aircraft skin, a second tubular cup coaxial with and nested in said first tubular cup and having its rim screwed into the first cup rim, said cups being radially separated adjacent the rims to form a slide space, said cups having their bottoms axially separated to form an enlargement of the slide space, a ring of bearing balls staked loosely in said second cup near the rim, said balls being adapted to seat radially inward and project into said second cup or seat radially outward and project into said slide space, a third cup nested between said first and second cups for axially sliding movement into holding position with the third cup rim camming said balls radially inward or into releasing position with said third cup rim withdrawn to allow withdrawal of balls into said slide space, a first spring between said first and third cup bottoms for resiliently urging the third cup into holding position, a tubular dome on said third cup bottom extending slidably through said first cup bottom, a cover-spindle having a face nested in the second cup and a stem extending slidably through the bottoms of said second and third cups into said tubular dome, said spindle being slidable into withdrawn position with the face withdrawn into the second cup or into flush position with the face flush with the rim of said second cup, a shoulder stop on the spindle stem to prevent movement beyond the flush position, a second spring resiliently urging said spindle into flush position, a latch in said dome movable into latched position across the axis of the device and into unlatched position to one side of said spindle stem, a detent on the first cup for moving the latch into unlatched position when the third cup is in releasing position whereby said spindle is free to move into flush position, and a spring resiliently urging the latch into latched position when the spindle is in flush position and the third cup is in holding position.

2. A device for selectively holding and releasing lugs on an aircraft body, comprising a first tubular cup having a rim, said rim being flush with the aircraft body, a second tubular cup coaxial with and nested in said first tubular cup, a third tubular cup nested between said first tubular cup and said second tubular cup for axially sliding movement into holding and releasing positions, a ring of ball bearings staked loosely in said second tubular cup near the rim, said balls being adapted to seat radially inward into the second cup or seat radially outward and project into a slide space, a cover-spindle having a flat face and slidably operable to move said flat face to a flush position with respect to the aircraft body, a first spring between the first tubular cup and said third tubular cup bottoms for resiliently urging said third tubular cup into holding position, a second spring between the cover-spindle and said second tubular cup for resiliently urging said cover-spindle into flush position, a spring-actuated latch, said latch movable into latched position across the axis of the device and into unlatched position to one side of the cover-spindle.

References Cited in the file of this patent
UNITED STATES PATENTS

| | | |
|---|---|---|
| 1,119,276 | Griffith et al. | Dec. 1, 1914 |
| 1,151,967 | Price | Aug. 31, 1915 |
| 1,468,732 | Bradbury | Sept. 25, 1923 |
| 2,259,257 | MacBlane | Oct. 14, 1941 |
| 2,478,019 | Sonntag | Aug. 2, 1949 |